(12) United States Patent
Bartels

(10) Patent No.: US 9,114,842 B2
(45) Date of Patent: Aug. 25, 2015

(54) MULTI-PASSENGER TRICYCLE

(71) Applicant: Radio Flyer Inc., Chicago, IL (US)

(72) Inventor: Ross Elliott Bartels, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 14/169,364

(22) Filed: Jan. 31, 2014

(65) Prior Publication Data

US 2014/0217696 A1    Aug. 7, 2014

Related U.S. Application Data

(60) Provisional application No. 61/759,812, filed on Feb. 1, 2013.

(51) Int. Cl.
| | |
|---|---|
| *B62K 9/02* | (2006.01) |
| *B62H 7/00* | (2006.01) |
| *B62B 7/00* | (2006.01) |
| *B62B 7/12* | (2006.01) |
| *B62B 5/08* | (2006.01) |
| *B62B 9/14* | (2006.01) |
| *B62B 9/20* | (2006.01) |
| *B62B 9/24* | (2006.01) |

(52) U.S. Cl.
CPC . *B62K 9/02* (2013.01); *B62B 7/008* (2013.01); *B62B 7/12* (2013.01); *B62H 7/00* (2013.01); *B62B 5/087* (2013.01); *B62B 9/14* (2013.01); *B62B 9/20* (2013.01); *B62B 9/24* (2013.01); *B62B 2206/006* (2013.01)

(58) Field of Classification Search
CPC ......................................................... B62K 9/02
USPC ......................................................... 280/282
See application file for complete search history.

(56) References Cited

U.S. PATENT DOCUMENTS

| 94,056 A | 8/1869 | Allen |
|---|---|---|
| 638,112 A | 11/1899 | Graham |

(Continued)

FOREIGN PATENT DOCUMENTS

| JP | 2003320983 | 11/2003 |
|---|---|---|
| JP | 2004099021 | 4/2004 |
| JP | 2006111222 | 4/2006 |

OTHER PUBLICATIONS

International Search Report, mailed May 23, 2014, for related International Patent Application No. PCT/US2014/014045.

(Continued)

*Primary Examiner* — Tony Winner
(74) *Attorney, Agent, or Firm* — McDermott Will & Emery LLP

(57) ABSTRACT

A tricycle is provided for supporting multiple passengers. The multi-passenger tricycle has a frame member, a steering assembly, a rear axle assembly, an auxiliary handlebar and a rear passenger foot platform. The steering assembly is rotatable and is coupled to a first end of the frame member. The rear axle assembly is coupled to the second end of the frame member. The auxiliary handlebar is coupled to the frame member between the first end and the second end of the frame member. The rear passenger foot platform is coupled to the frame member adjacent a second end of the frame member, and is at least partially above the rear axle assembly. Preferably, the rear passenger foot platform includes a first foot platform on one side of the frame member and a second foot platform on an opposing side of the frame member.

18 Claims, 7 Drawing Sheets

(56) References Cited

U.S. PATENT DOCUMENTS

| | | |
|---|---|---|
| 2,194,161 A | 3/1940 | Cobb |
| 2,619,364 A | 11/1952 | Carson |
| 2,816,775 A | 12/1957 | Costello |
| 3,485,507 A | 12/1969 | Christof |
| 3,905,618 A | 9/1975 | Miranda |
| 3,954,283 A | 5/1976 | Boehm et al. |
| 4,457,529 A | 7/1984 | Shamie et al. |
| 4,657,270 A | 4/1987 | Allen et al. |
| 5,028,066 A | 7/1991 | Garth |
| D332,591 S | 1/1993 | Reely |
| D334,157 S | 3/1993 | Tonelli |
| 5,924,713 A | 7/1999 | Li |
| 5,954,349 A | 9/1999 | Rutzel |
| 6,120,048 A | 9/2000 | Li |
| 6,152,473 A | 11/2000 | Shih |
| D436,560 S | 1/2001 | Golenz |
| D436,896 S | 1/2001 | Chiappepta et al. |
| D436,897 S | 1/2001 | Chiappepta et al. |
| 6,302,421 B1 | 10/2001 | Lee |
| D461,145 S | 8/2002 | Chiappetta et al. |
| 6,575,486 B2 | 6/2003 | Ma |
| 6,609,723 B2 | 8/2003 | Chuang |
| 6,612,598 B2 | 9/2003 | Wu |
| 6,666,470 B2 | 12/2003 | Li |
| 6,840,527 B1 | 1/2005 | Michelau et al. |
| 6,874,802 B2 | 4/2005 | Gunter et al. |
| 6,935,649 B2 | 8/2005 | Lim |
| 6,966,572 B2 | 11/2005 | Michelau et al. |
| 7,000,935 B2 | 2/2006 | Gunter et al. |
| 7,210,696 B2 | 5/2007 | Kettler et al. |
| 7,281,725 B1 | 10/2007 | Gunter et al. |
| 7,300,066 B2 | 11/2007 | Kettler et al. |
| D567,719 S | 4/2008 | Grossman |
| D593,910 S | 6/2009 | Calvin et al. |
| D598,331 S | 8/2009 | Tongish et al. |
| 7,658,252 B2 | 2/2010 | Shapiro |
| D659,054 S | 5/2012 | Agati et al. |
| 8,262,114 B2 | 9/2012 | Jessie, Jr. |
| 2003/0141695 A1 | 7/2003 | Chen |
| 2005/0110239 A1 | 5/2005 | Michelau et al. |
| 2007/0045983 A1 | 3/2007 | Hong |
| 2008/0277901 A1 | 11/2008 | Catelli |
| 2009/0008164 A1 | 1/2009 | Shapiro |
| 2010/0289244 A1 | 11/2010 | Grossman |
| 2010/0308561 A1 | 12/2010 | Diekman et al. |
| 2012/0306179 A1 | 12/2012 | Jessie, Jr. |

OTHER PUBLICATIONS

MyRider® Chariot/MyRider™Trikes, http://www.angelesstore.com/index.php/MyRider™-Trikes/myrider-chariot.html, at least as early as Mar. 16, 2013.

MyRider® Tandom, http://www.angelesstore.com/index.php/MyRider™-Trikes/myrider-tandem.html, at least as early as Mar. 16, 2013.

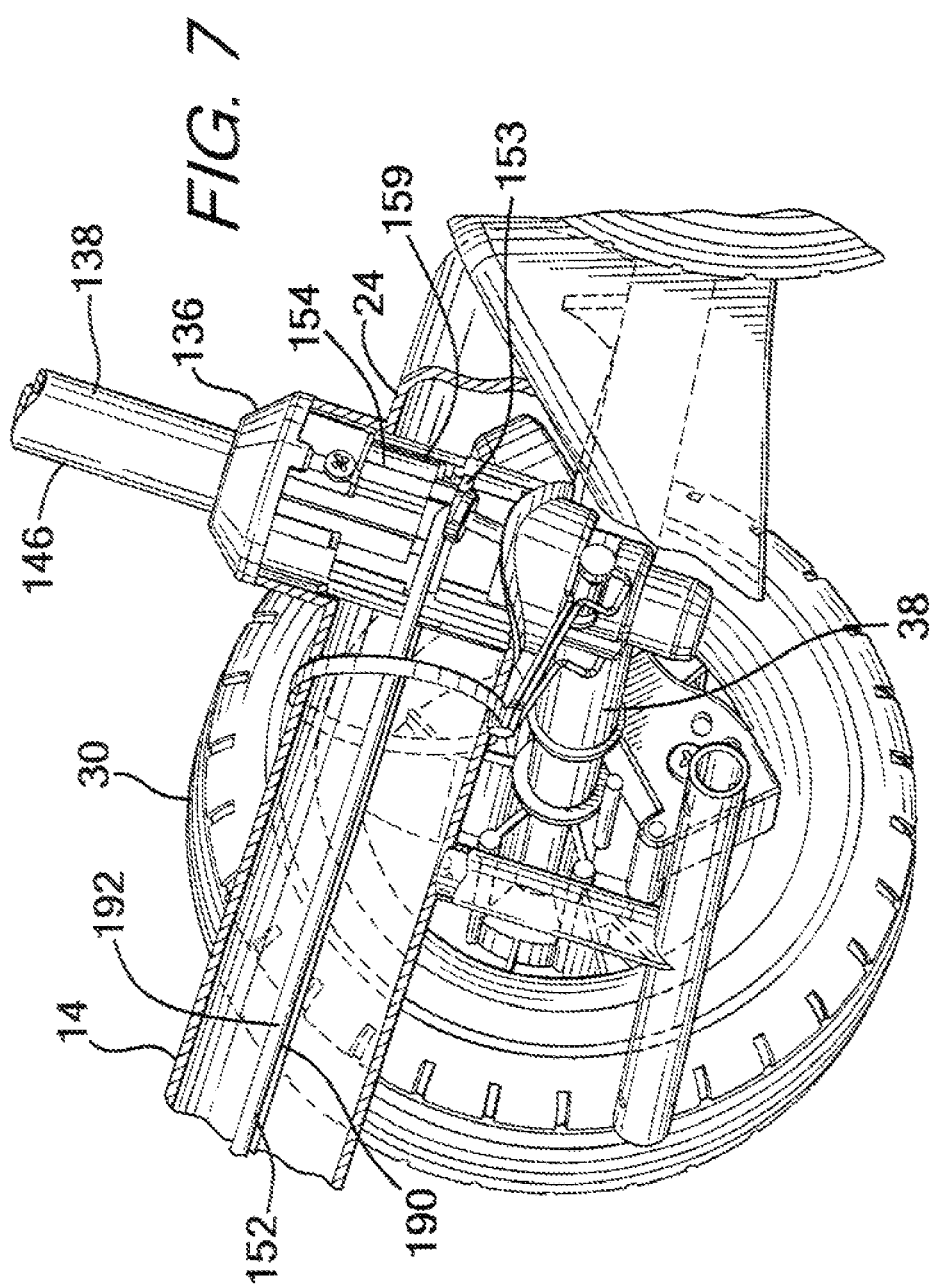

MULTI-PASSENGER TRICYCLE

CROSS-REFERENCE TO RELATED APPLICATIONS

This application claims priority to U.S. Provisional Patent Application No. 61/759,812, filed Feb. 1, 2013, which is incorporated herein by reference in its entirety and made a part hereof.

FEDERALLY SPONSORED RESEARCH OR DEVELOPMENT

Not Applicable.

TECHNICAL FIELD

The present disclosure generally relates to a multi-passenger tricycle. In particular, a tricycle is provided with a foot platform and a second set of handlebars to accommodate a second passenger in a standing position. The tricycle can also include removable accessories that allow the tricycle to function as a stroller, as well as a parent steering system.

BACKGROUND

Standard tricycles are generally known in the art. Further, tricycles that include an upwardly extending rear handle to allow a parent to steer the tricycle are similarly known. Some tricycles include features such as a footrest for a seated child to use while the parent is pushing the tricycle. Other tricycles include a substantially rigid restraining hoop that extends around the seated child, and a safety harness that secures the seated child to the seat. Some tricycles also include a trailer for pulling a second rider. Notwithstanding, the present embodiment seeks to overcome certain of the limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a multi-passenger tricycle. In one embodiment the multi-passenger tricycle has a frame member, a steering assembly, a rear axle assembly, an auxiliary handlebar and a rear passenger foot platform.

According to another embodiment, the frame member is a hollow main frame member having a first end and a second end.

According to another embodiment, the steering assembly is rotatable. The steering assembly may be coupled to the first end of the main frame member and also have a front wheel rotatably coupled thereto.

According to another embodiment, the rear axle assembly is coupled to the second end of the main frame member and has an axle and first and second rear wheels rotatably coupled thereto.

According to another embodiment, the auxiliary handlebar is coupled to the main frame member between the first end and the second end of the main frame member.

According to another embodiment, an auxiliary steer mechanism for the multi-passenger tricycle is coupled to the second end of the main frame member.

According to another embodiment, auxiliary steer coupling members are coupled to the auxiliary steer mechanism and to the steering assembly. The auxiliary coupling members are configured to provide an output to the rotatable steering assembly based on input from the auxiliary steer mechanism.

According to another embodiment, an auxiliary steer handle can be removably coupled to the auxiliary steer mechanism to allow a parent to steer the tricycle.

According to another embodiment, the rear passenger foot platform is coupled to the main frame member adjacent a second end of the main frame member, and is preferably positioned at least partially above the rear axle assembly. According to another embodiment, the rear passenger foot platform comprises a central portion extending over the main frame member and connecting a first foot platform and a second foot platform on opposing sides of the main frame member.

According to another embodiment, a seat plate is connected to the main frame member at a location between the first end and the second end. In an alternate embodiment, the auxiliary handlebar is connected to the seat plate and extends generally vertically upwards and behind the seat. Further, in an alternate embodiment, a seat for the rider of the multi-passenger tricycle is connected to the seat plate.

According to another embodiment, a brake is connected to the rear axle assembly to assist in precluding unwanted movement of the tricycle.

According to another embodiment, the multi-passenger tricycle has a hollow main frame member having a first end and a second end; a rotatable steering assembly coupled to the first end of the main frame member, the steering assembly having front wheel rotatably coupled thereto; a rear axle assembly coupled to the second end of the main frame member, the rear axle assembly having an axle and first and second rear wheels rotatably coupled thereto; an auxiliary handlebar coupled to the main frame member between the first end and the second end of the main frame member; an auxiliary steer mechanism coupled to the second end of the main frame member; auxiliary steer coupling members coupled to the auxiliary steer mechanism and the steering assembly, the auxiliary coupling members configured to provide an output to the rotatable steering assembly based on input from the auxiliary steer mechanism; and, a rear passenger foot platform coupled to the main frame member adjacent a second end of the main frame member, the rear passenger foot platform being positioned at least partially above the rear axle assembly.

According to another embodiment, the multi-passenger tricycle has a linear main frame tube having a first end and a second end; a rotatable steering assembly coupled to the first end of the main frame tube, the steering assembly having front wheel rotatably coupled thereto; a rear axle assembly coupled to the second end of the main frame tube, the rear axle assembly having an axle and first and second rear wheels rotatably coupled thereto; an auxiliary handlebar coupled to the main frame tube between the first end and the second end of the main frame tube, the auxiliary handlebar having a transverse member connected thereto and configured for a rear passenger to grasp; and, a rear passenger foot platform coupled to the main frame tube adjacent a second end of the main frame member, the rear passenger foot platform being positioned at least partially above the rear axle assembly.

According to another embodiment, the multi-passenger tricycle has a main frame member having a first end and a second end; a rotatable steering assembly coupled to the first end of the main frame member, the steering assembly having a front wheel rotatably coupled thereto; a rear axle assembly coupled to the second end of the main frame member, the rear axle assembly having an axle and first and second rear wheels rotatably coupled thereto; an auxiliary handlebar coupled to the main frame member between the first end and the second end of the main frame member, the auxiliary handlebar having a transverse member connected thereto and configured for a rear passenger to grasp; and, a rear passenger foot platform coupled to the main frame member adjacent a second end of the main frame member, the rear passenger foot platform being positioned at least partially above the rear axle assembly, wherein the rear passenger foot platform comprises a first foot platform on one side of the main frame member, and a second foot platform on an opposing side of the main frame member.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 7 is a partially cut-away rear perspective view of another portion of the multi-passenger tricycle of FIG. 2.

DETAILED DESCRIPTION

Figure 1:
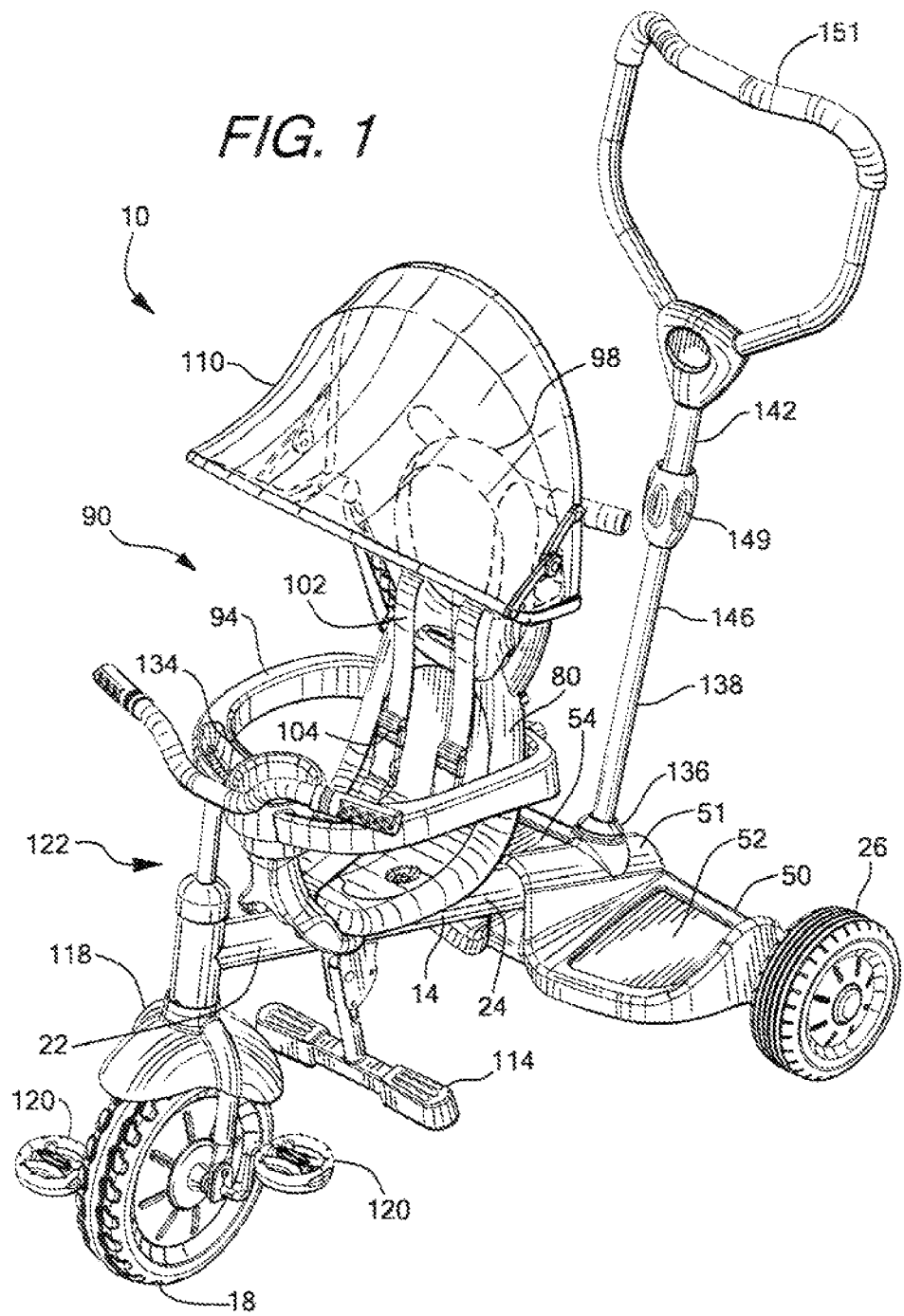
FIG. 1 is a front perspective view of a multi-passenger tricycle according to one embodiment.

While the multi-passenger tricycle discussed herein is susceptible of embodiments in many different forms, there is shown in the drawings, and will herein be described in detail, preferred embodiments with the understanding that the present description is to be considered as an exemplification of the principles of the multi-passenger tricycle and are not intended to limit the broad aspects of the disclosure to the embodiments illustrated.

The multi-passenger tricycle is a product that can be used by children from the infant stage through the toddler stage and into the adolescent stage and beyond. For example, the multi-passenger tricycle can operate as a stroller with a safety harness (i.e., a five point seat belt), an infant stroller support hoop, a sun canopy and a handle for the parent to push and steer the stroller. Further, as the child grows, the safety harness, infant support hoop and sun canopy can be removed, independently as desired by the user, such that the tricycle operates as an infant push tricycle. In the push tricycle stage the multi-passenger tricycle can be used as a traditional tricycle by the child, but it also has foot supports if the child gets tired of pedaling, whereby the child can rest his or her feet on the foot supports and the parent can use the parent steer handle to push and steer the tricycle. Finally, when the child no longer needs the parent steer handle and/or the foot supports, they can likewise be independently removed for use as a traditional tricycle. Moreover, in each of these configurations the tricycle has a foot platform and a set of handlebars located behind the tricycle seat to accommodate a second standing passenger.

Referring now to the figures, and initially to FIGS. 1-6, in one embodiment the multi-passenger tricycle 10 includes a main frame member 14, a front wheel 18 supporting a forward portion or first end 22 of the main frame member 14, and a rear axle assembly coupled to and supporting the rearward portion or second end 24 of the main frame member 14. In a preferred embodiment the main frame member 14 comprises a linear tube extending from its first end 22 to its second end 24. In one embodiment the rear axle assembly comprises first and second rear wheels 26, 30 supporting a rearward portion or second end 24 of the main frame member 14. Preferably, the first rear wheel 26 is rotatably supported at a first end of a rear axle 38, and the second rear wheel 30 is rotatably supported at a second end of the rear axle 38. A brake assembly 36 may be provided on one or both of the first and second rear wheels 26, 30. The brake assembly 36 may be connected to the rear axle assembly to assist in precluding unwanted movement of the tricycle. The brake assemblies 36 are typically used in the stroller configuration, however, they may be used in the tricycle configuration as well.

Figure 4:
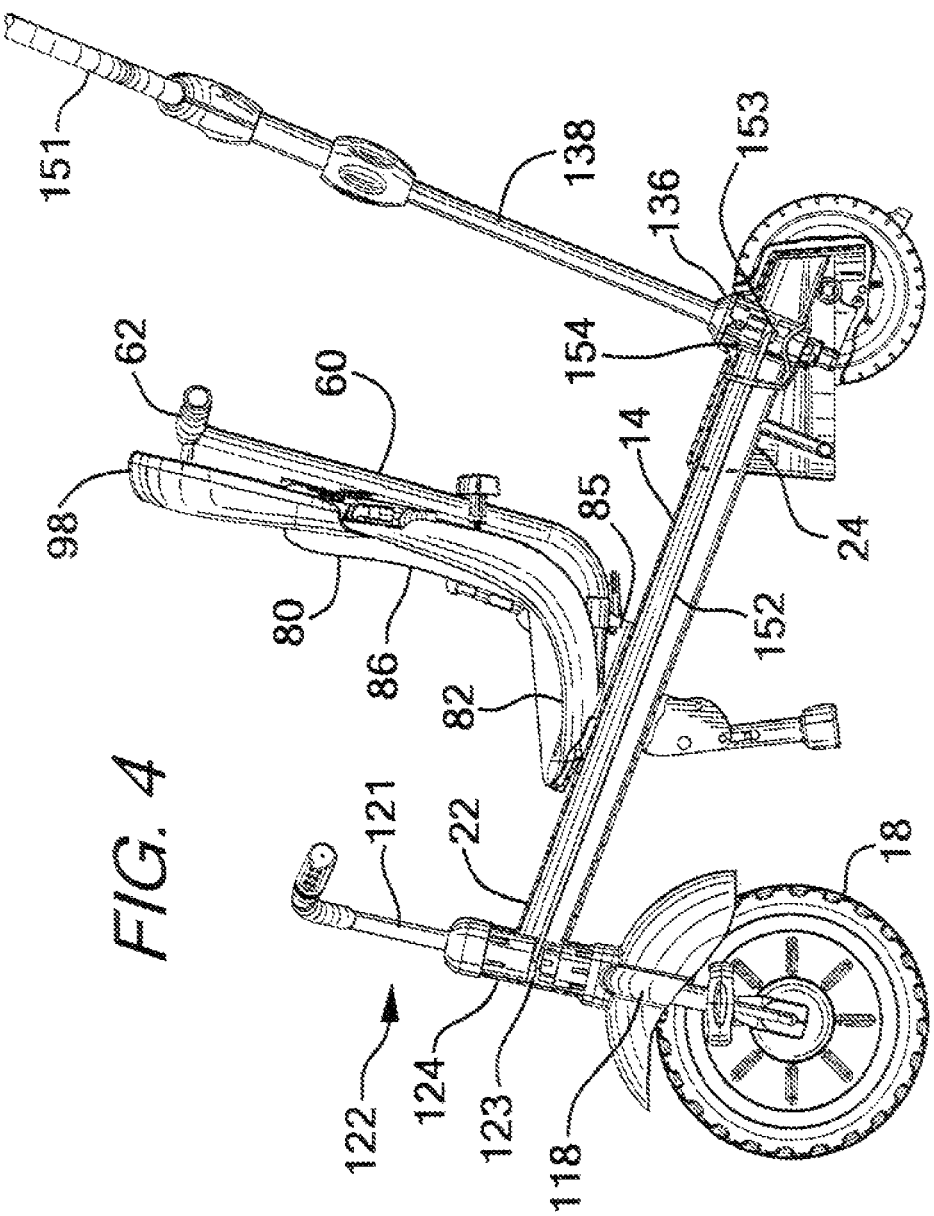
FIG. 4 is a side elevation view of the multi-passenger tricycle of FIG. 2.
Figure 5:
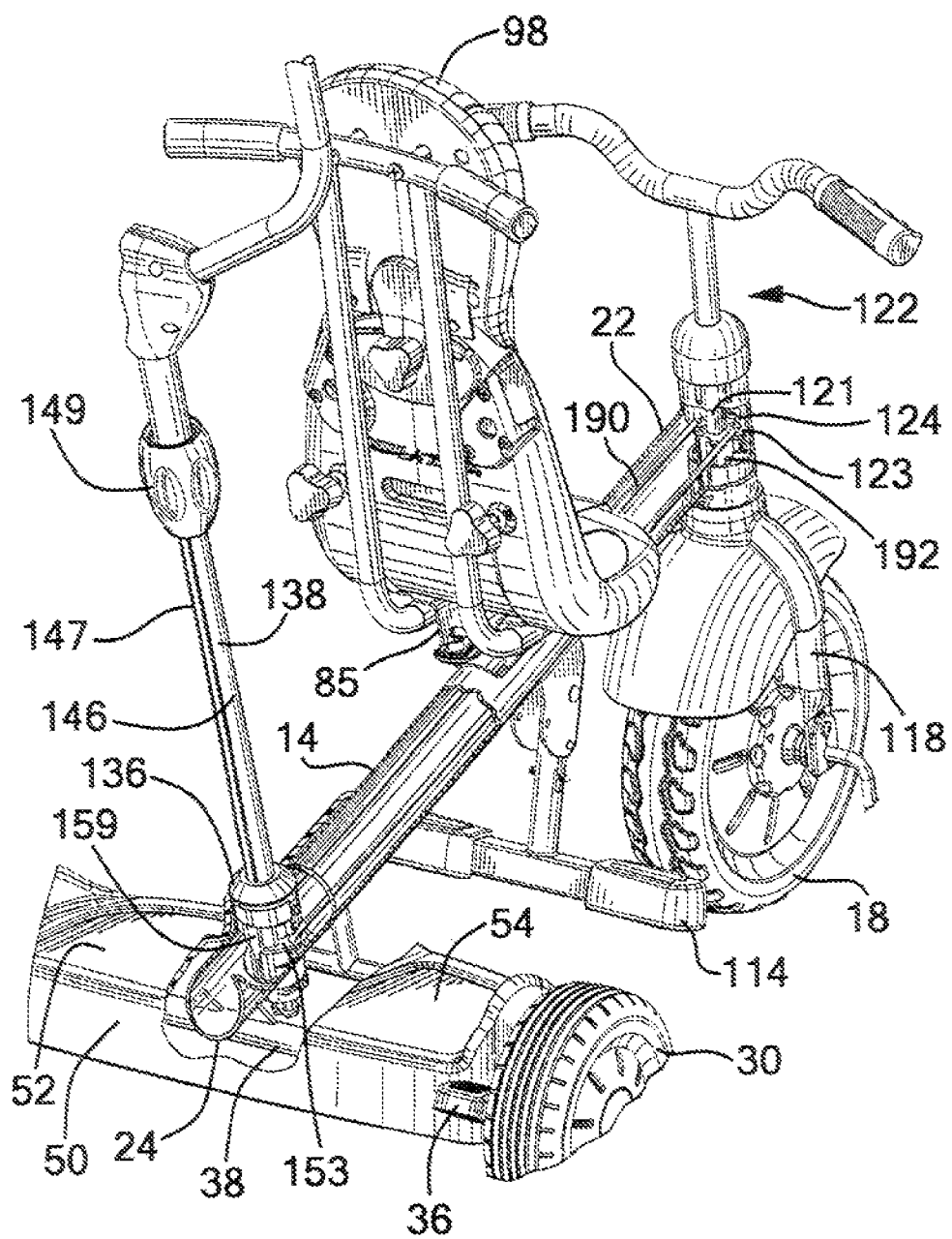
FIG. 5 is a partially cut-away rear perspective view of the multi-passenger tricycle of FIG. 2.

As shown in FIGS. 1, 4 and 5, in one embodiment a seat plate 85 is coupled to the main frame member 14 at a location between the first end 22 and the second end 24 of the main frame member 14. The seat plate 85 may support the rider. Alternately, a seat 80 for the rider may be connected to the seat plate 85. In one embodiment, the seat 80 includes a seat base 82 and a seat back 86 that are integrally formed. Alternatively the seat may be formed of a separate seat base and seat back that are attached together or mounted separately, for example. As further shown in FIG. 1, an optional infant restraint assembly 90 is removably coupled to the seat 80 or seat plate 85. The restraint assembly 90 may include one or more of a restraining hoop 94 removably coupled to the seat base 82 and/or the seat back 86, a head rest 98 removably coupled to the seat back 86, and a safety harness 102 having one end coupled to the restraining hoop 94 and an opposite end coupled to the head rest 98. The safety harness 102 includes buckles 104 for securing the safety harness 102 about a child. The restraint assembly 90 may also include a drink holder 134, which may be configured to hold a bottle, a cup or a can, for example. The tricycle 10 also includes a canopy assembly 110 that is removably coupled to the seat back 86. The canopy assembly 110 is pivotable and extendable to a variety of positions to shield a child seated on the tricycle 10 from the sun.

Figure 2:
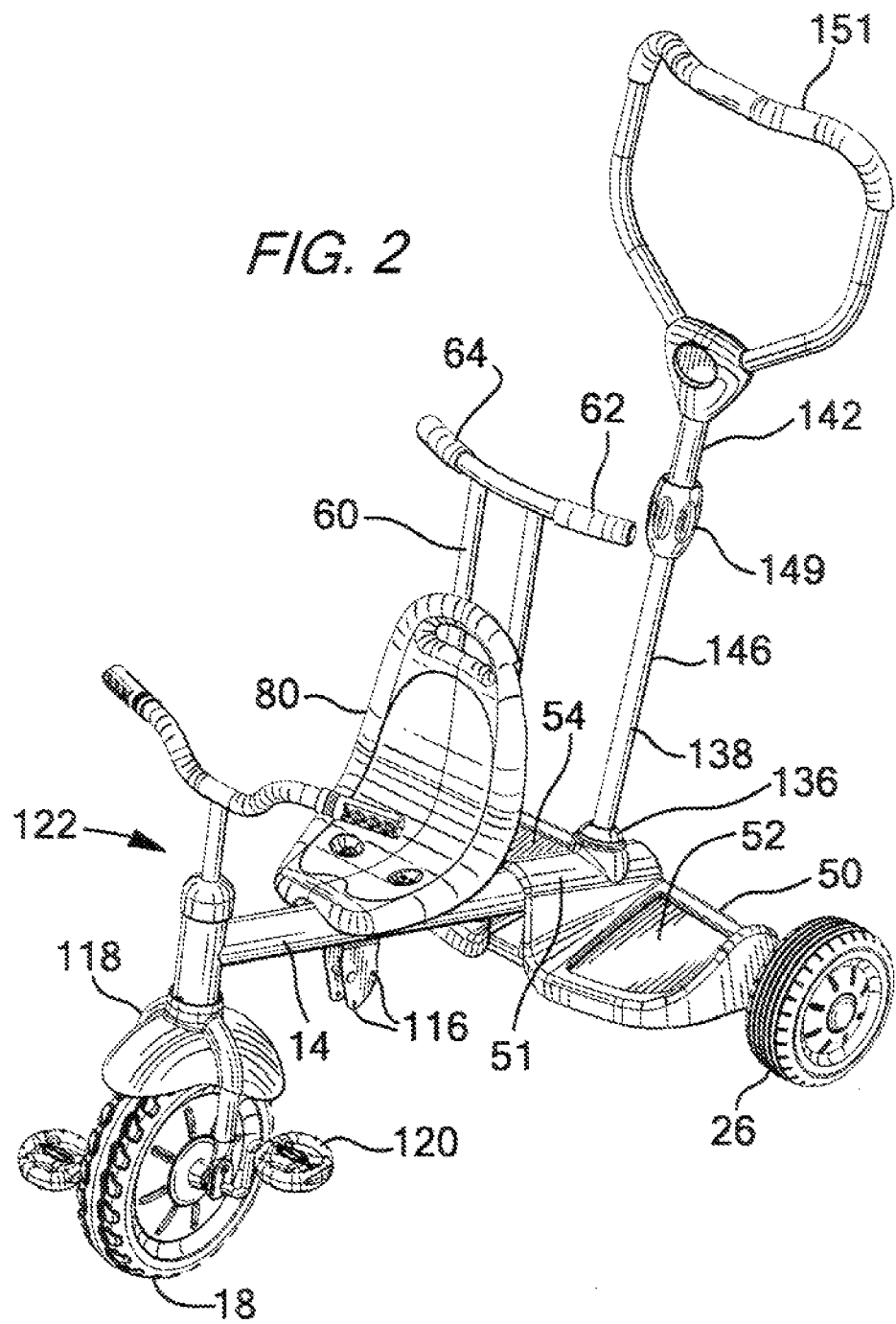
FIG. 2 is a front perspective view of a multi-passenger tricycle according to another embodiment.
Figure 3:
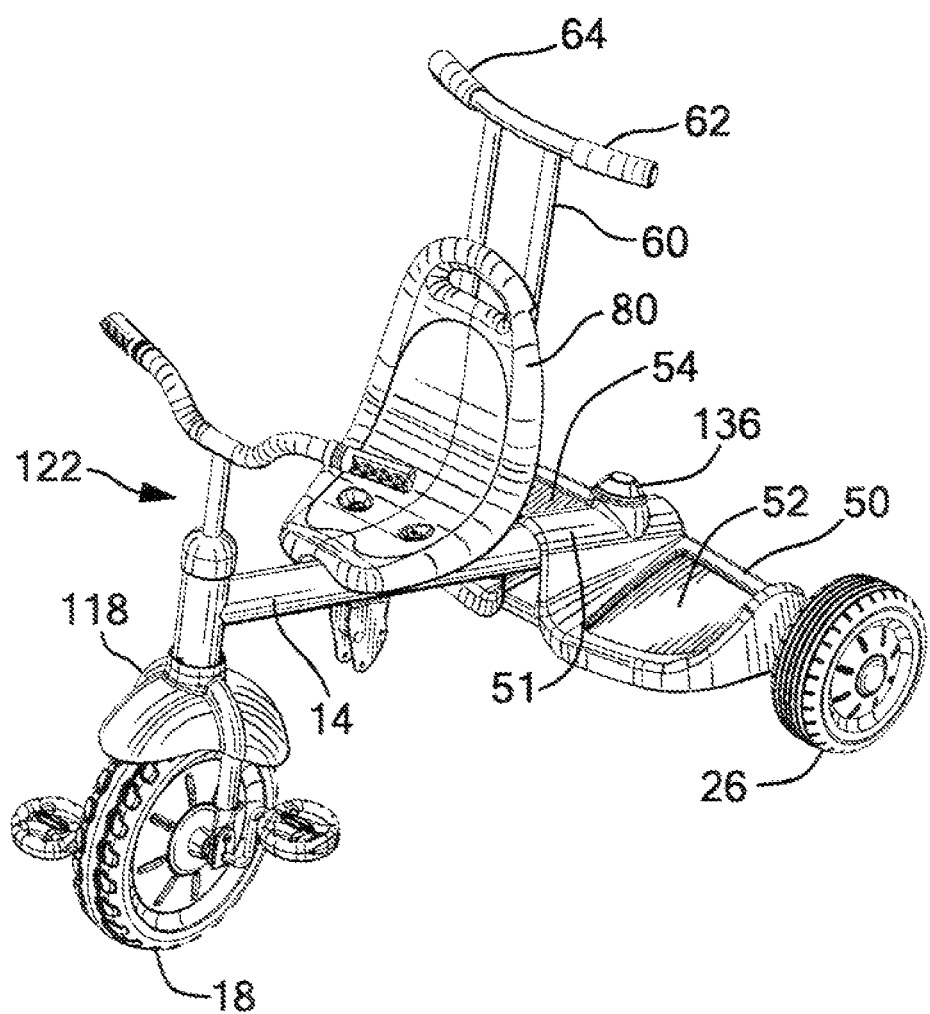
FIG. 3 is a front perspective view of a multi-passenger tricycle according to another embodiment.

A foldable footrest 114 is provided and is preferably pivotably coupled to the main frame member 14 adjacent a first end 22 thereof. The foldable footrest 114 is shown in the use position in FIG. 1. A pair of latches or detents 116 may be provided to secure the footrest 114 in both the folded and unfolded positions. Finally, as shown in FIGS. 2 and 3, the footrest 114 is removable for when the child is able to pedal the tricycle 10 on his or her own.

As shown in FIGS. 1-5, the front wheel 18 is rotatably supported by a front fork 118 that in turn is rotatedly coupled to the forward portion or first end 22 of the main frame member 14 to enable steering of the tricycle 10. A clutch mechanism (not shown) may be provided within the front wheel 18 so the tricycle 10 can be pushed forwardly, and the front wheel 18 can rotate, even though a child positioned on the tricycle 10 may have their feet positioned on pedals 120 and may be preventing the pedals 120 from moving.

A rotatable steering assembly 122 is coupled to the first end 22 of the main frame member 14. The rotatable steering assembly 122 is also coupled to the front fork 118 such that rotating or turning of the steering assembly 122 rotates or turns the front wheel 18. Accordingly the front wheel 18 is rotatably coupled to the steering assembly 122.

Figure 6:
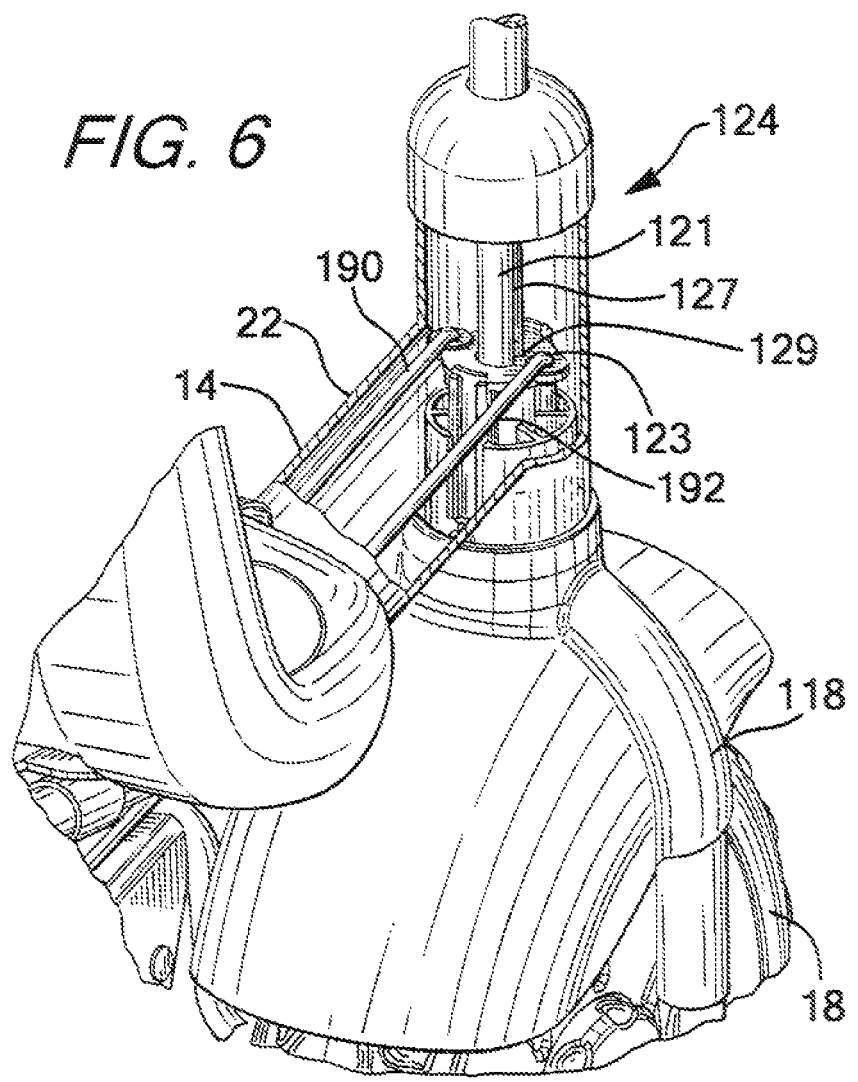
FIG. 6 is a partially cut-away rear perspective view of a portion of the multi-passenger tricycle of FIG. 2.

In one embodiment, as explained above, the multi-passenger tricycle 10 also includes an auxiliary steer mechanism 136 coupled to the second end 24 of the main frame member 14. The auxiliary steer mechanism 136 allows a parent or person behind the tricycle 10 to not only push the tricycle 10, especially when the child is younger and unable to operate the tricycle 10, but also to steer the tricycle 10. The auxiliary steer mechanism 136 is controlled by an auxiliary steer handle 138, also referred to as a parent steer handle 138. The auxiliary steer handle 138 can be removably coupled to the auxiliary steer mechanism 136 to allow a parent to steer the tricycle 10. Additionally, as shown in FIGS. 6 and 7, the auxiliary steer mechanism 136 is coupled to auxiliary steer coupling members 152, which in turn are coupled to the steering assembly 122. In one embodiment the main frame member 14 is a hollow tube and the auxiliary steer coupling members 152 extend through the main frame member 14, from generally the first end 22 to the second end 24. Since the steering assembly 122 is coupled to the front fork 118 and front wheel 18, rotation of the auxiliary steer handle 138 about its axis rotates the front fork 118 to steer the tricycle 10. Put another way, in one embodiment, an input from the auxiliary steer handle 138 operates as an input from the auxiliary steer mechanism 136, which in turn is transferred through the auxiliary steer coupling members 152 to provide an output for the rotatable steering assembly 122. In this manner, the auxiliary steer handle 138 can be used by a parent to steer the tricycle 10, especially in the stroller mode for use with a young child. In one embodiment, the auxiliary steer handle 138 is removably connected to the auxiliary steer mechanism 136 of the tricycle 10 so that the auxiliary steer handle 138 can be removed from the tricycle 10 for use and/or storage. The auxiliary steer handle may include a hand grip portion 151 configured for manipulation by the parent. The illustrated hand grip portion 151 forms a closed loop, however other configurations including T-shaped or V-shaped hand grip portions 151 may also be utilized.

In another embodiment, the auxiliary steer handle 138 can be made adjustable, for example by providing an upper shaft 142, a lower shaft 146, and a coupling assembly 149 between the upper and lower shafts 142, 146. Handle 138 is moveable between a variety of positions to provide a comfortable grip and/or handle position for different sizes of users that may be steering the tricycle 10. To adjust the handle 138, the coupling assembly 149 may be rotatable between locked and unlocked configurations that selectively prevent or permit relative movement between the upper and lower shafts 142, 146 to adjust the handle 138 between and including fully extended and fully retracted positions. For example, when the coupling assembly 149 is unlocked, the upper shaft 142 may be slid downwardly over the lower shaft 146 thereby shortening the overall length of the handle 138. Finally, the handle 138 may be removable from the auxiliary steer mechanism 136 of the tricycle 10 to allow the child to operate the tricycle 10 without parental guidance or assistance.

A bag (not shown) or other storage device may be secured to and extend within the space surrounded by the hand grip portion 151. The bag may include a sleeve, a tube, or similar structure that receives the end of the lower shaft 146 when the handle 138 is in the retracted position, and in this configuration the portion of the lower shaft 146 that extends between the grip portion 151 of the handle 138 would be retained within the bag and would not be visible.

Referring also to FIGS. 4, 5 and 7, the lower shaft 146 of the auxiliary steer handle 138 can be seen extending into the rearward portion or second end 24 of the main frame 14 for engagement with the auxiliary steer mechanism 136. The auxiliary steer mechanism 136 provides structure to convert the input from the auxiliary steer member 138 to an output provided to the auxiliary steer coupling members 152 and ultimately the steering assembly 122. In one embodiment the auxiliary steer mechanism includes a rear coupling assembly 154 having a pivot member 153. The lower shaft 146 may be connected to the rear coupling assembly 154 in any suitable manner. In the illustrated embodiment, the lower shaft 146 has a groove 147 and the rear coupling assembly 154 is internally sized and shaped to receive the lower shaft 146 such that an engaging member 159 of the rear pivot member 153 of the rear coupling assembly 154 is seated within groove 147. Thus, when the lower shaft 146 is rotated about its longitudinal axis, the rear pivot member 153 of the rear coupling assembly 154 correspondingly rotates about the same axis. The rear pivot member 153 of the rear coupling assembly 154 is configured to receive the ends of the auxiliary steer coupling members 152, which in a preferred embodiment includes first steering rod 190 and second steering rod 192.

As further illustrated in FIGS. 5 and 6, the steering assembly 122 includes a front shaft 121 that is engaged with a front coupling assembly 124. In one embodiment, the front coupling assembly 124 includes a front pivot member 123. The front pivot member 123 is attached to the front shaft 121 in any suitable manner, such as by engaging members 129 engaging with front shaft grooves 127 as shown in the illustrated embodiment. The front pivot member 123 of the front coupling assembly 124 is configured to receive the front ends of first and second steering rods 190 and 192 of the auxiliary steer coupling 152. The first and second steering rods 190, 192 provide a linkage between the auxiliary steer handle 138 and the steering assembly 122. Thus, when the rear pivot member 153 is rotated about its longitudinal axis as the auxiliary steer handle 138 is turned, the first and second steering rods 190, 192 push or pull, respectively, on the front pivot member 123 of the front coupling assembly 124, causing the front shaft 121 of the steering assembly 122 to rotate in a manner corresponding to the rotation of the auxiliary steer handle 138.

While the illustrated embodiment of the auxiliary steer mechanism and auxiliary steer coupling members uses an arrangement of coupling assemblies and steering rods, alternative configurations may be used, such as chain and/or belt drives, different types of gearing arrangements, bevel gears and drive shafts, and the like.

To summarize, in the illustrated configuration, rear steering of the tricycle 10 (i.e., steering of the front wheel 18 via the auxiliary steer handle 138) is accomplished by manipulation of the hand grip portion 151 which rotates the upper and lower shafts 142, 146 of the auxiliary steer handle 138. As shown in FIG. 7, rotation of the lower shaft 146 rotates the rear pivot member 153. Rotation of the rear pivot member 153 causes one of the first and second steering rods 190, 192 to pull towards the rear of the tricycle 10 and the other of the first and second steering rods 190, 192 to push towards the front of the tricycle 10, thereby causing the front pivot member 123 to rotate in a manner corresponding to the rotation of the rear pivot member 153. Rotation of the front pivot member 123 rotates the front shaft 121, thereby causing the front wheel 18 that is attached to the front shaft 121 via the front fork 118 to turn in a manner corresponding to the turning of the auxiliary steer handle 138. Although a one-way coupling device could be incorporated if desired, in the illustrated configuration, the rear-steer assembly can be "back driven" whereby rotation of the steering assembly 122 causes corresponding rotation of the hand grip portion 151.

Referring to FIG. 1, the tricycle 10 also includes a rear passenger foot platform 50 that may be mounted over or coupled adjacent the second end 24 of the main frame 14 and/or the rear axle assembly, and between the rear wheels 26, 30. In one embodiment the rear passenger foot platform 50 may include a first foot surface or platform 52 on one side of the main frame member 14, and a second foot surface or platform 54 on the opposing side of the main frame member 14. The foot platforms 52, 54 are configured to respectively receive a standing passenger's left and right foot. In one embodiment a central portion 51 of the rear passenger foot platform 50 extends over the main frame member 14 and connects the first foot platform 52 and the second foot platform 54.

The tricycle 10 further includes an auxiliary handlebar or rear handlebar 60 that is coupled to main the frame 14 between the first end 22 and the second end 24 of the main frame 14. In one embodiment the auxiliary handlebar 60 is coupled to the main frame 14 through the seat plate 85. Alternatively, the auxiliary handlebar assembly 60 may be coupled to the tricycle 10 in any suitable manner, such as to the seat 80 or the frame 14, for example. In a preferred embodiment the auxiliary handlebar 60 extends generally vertically upwards and behind the seat 80. In one embodiment, there may be included first and second hand grips or handles 62, 64 extending in opposing directions and transverse from the auxiliary handlebar 60 and configured to be gripped by a rear passenger who is standing on the rear passenger foot platform 50.

The combination of the rear passenger foot platform 50 and the rear handlebar assembly 60 allow for a passenger to safely and comfortably ride on the tricycle 10 in a standing position. For example, a first child (e.g., an infant or a toddler) may sit in the seat 80 while a second child (e.g., an older child) may stand on the rear passenger foot platform 50 and hold onto the rear handlebar assembly 60. Thus, both children may be pushed by a parent in the manner of a double-stroller, or the first child may pedal the tricycle 10 while the second child rides in a standing position on the rear. Alternatively, just one child may ride on the tricycle in either the front seated position or the rear standing position.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A multi-passenger tricycle, comprising:
    a hollow main frame member having a first end and a second end;
    a rotatable steering assembly coupled to the first end of the main frame member, the steering assembly having front wheel rotatably coupled thereto;
    a rear axle assembly coupled to the second end of the main frame member, the rear axle assembly having an axle and first and second rear wheels rotatably coupled thereto;
    a seat plate connected directly to the main frame member at a location between the first end and the second end, the seat plate having a planar surface;
    a seat for the rider of the multi-passenger tricycle connected directly to the planar surface of the seat plate;
    an auxiliary handlebar connected directly to the seat plate and extending transversely from the seat plate;
    an auxiliary steer mechanism coupled to the second end of the main frame member;
    auxiliary steer coupling members coupled to the auxiliary steer mechanism and the steering assembly, the auxiliary coupling members configured to provide an output to the rotatable steering assembly based on input from the auxiliary steer mechanism; and,
    a rear passenger foot platform coupled to the main frame member adjacent a second end of the main frame member, the rear passenger foot platform being positioned at least partially above the rear axle assembly.

2. The multi-passenger tricycle of claim 1, wherein the auxiliary steer mechanism is not connected to the seat plate.

3. The multi-passenger tricycle of claim 1, further comprising a pair of handles extending in opposing directions and transverse from the auxiliary handlebar.

4. The multi-passenger tricycle of claim 1, further comprising an auxiliary steer handle that can be removably coupled to the auxiliary steer mechanism to allow a caregiver to steer the tricycle.

5. The multi-passenger tricycle of claim 1, further comprising a brake connected to the rear axle assembly to assist in precluding unwanted movement of the tricycle.

6. The multi-passenger tricycle of claim 1, wherein the rear passenger foot platform comprises a first foot platform on one side of the main frame member, and a second foot platform on an opposing side of the main frame member.

7. The multi-passenger tricycle of claim 1, wherein the auxiliary handlebar has a horizontal portion extending from the seat plate and a vertical portion extending therefrom.

8. A multi-passenger tricycle, comprising:
    a linear main frame tube having a first end and a second end;
    a rotatable steering assembly coupled to the first end of the main frame tube, the steering assembly having front wheel rotatably coupled thereto;

a rear axle assembly coupled to the second end of the main frame tube, the rear axle assembly having an axle and first and second rear wheels rotatably coupled thereto;

a seat plate connected directly to the linear main frame, the seat plate having a planar surface;

a seat connected to the planar surface of the seat plate;

an auxiliary handlebar coupled to the seat plate and having a transverse portion extending generally vertically from the seat plate, the auxiliary handlebar having a generally horizontal transverse member connected thereto and configured for a rear passenger to grasp; and, a rear passenger foot platform coupled to the main frame tube adjacent a second end of the main frame member, the rear passenger foot platform being positioned at least partially above the rear axle assembly.

9. The multi-passenger tricycle of claim 8, wherein the rear passenger foot platform comprises a first foot platform on one side of the main frame tube, and a second foot platform on an opposing side of the main frame tube.

10. The multi-passenger tricycle of claim 8, wherein the generally horizontal transverse member connected to the auxiliary handlebar comprises a pair of handles extending in opposing directions.

11. The multi-passenger tricycle of claim 8, further comprising a brake connected to the rear axle assembly to assist in precluding unwanted movement of the tricycle.

12. The multi-passenger tricycle of claim 8, further comprising an auxiliary steer mechanism coupled to the second end of the main frame tube, the auxiliary steer mechanism configured to steer the steering assembly.

13. The multi-passenger tricycle of claim 12, further comprising auxiliary steer coupling members coupled to the auxiliary steer mechanism and the steering assembly, the auxiliary coupling members configured to provide an output to the rotatable steering assembly based on input from the auxiliary steer mechanism.

14. The multi-passenger tricycle of claim 13, wherein the auxiliary steer coupling members extend through the main frame tube to operably connect the auxiliary steer mechanism and the steering assembly.

15. A multi-passenger tricycle, comprising:

a main frame member having a first end and a second end;

a rotatable steering assembly coupled to the first end of the main frame member, the steering assembly having front wheel rotatably coupled thereto;

a rear axle assembly coupled to the second end of the main frame member, the rear axle assembly having an axle and first and second rear wheels rotatably coupled thereto;

a seat plate connected directly to the main frame member, the seat plate having a planar surface;

a seat connected to the planar surface of the seat plate;

an auxiliary handlebar coupled to the seat plate and having a transverse portion extending generally vertically from the seat plate, the auxiliary handlebar having a generally horizontal transverse member connected thereto and configured for a rear passenger to grasp; and, a rear passenger foot platform coupled to the main frame member adjacent a second end of the main frame member, the rear passenger foot platform being positioned at least partially above the rear axle assembly, wherein the rear passenger foot platform comprises a first foot platform on one side of the main frame member, and a second foot platform on an opposing side of the main frame member.

16. The multi-passenger tricycle of claim 15, further comprising a brake connected to the rear axle assembly to assist in precluding unwanted movement of the tricycle.

17. The multi-passenger tricycle of claim 15, further comprising an auxiliary steer mechanism coupled to the second end of the main frame member, the auxiliary steer mechanism configured to steer the steering assembly.

18. The multi-passenger tricycle of claim 17, wherein the main frame member is a linear tube, and wherein the auxiliary steer mechanism is coupled to the steering assembly with auxiliary coupling members configured to provide an output to the rotatable steering assembly based on input from the auxiliary steer mechanism.

* * * * *